(No Model.) 2 Sheets—Sheet 1.

H. BRIGGS.
CHAIN GEARING.

No. 528,847. Patented Nov. 6, 1894.

WITNESSES:
E. Wolff
Chas. E. Svensgen

INVENTOR:
Henry Briggs.
BY
Hauff & Hauff
his ATTORNEYS.

THE NORRIS PETERS CO., PHOTO-LITHO., WASHINGTON, D. C.

(No Model.) 2 Sheets—Sheet 2.

H. BRIGGS.
CHAIN GEARING.

No. 528,847. Patented Nov. 6, 1894.

WITNESSES:

INVENTOR:
Henry Briggs.
BY
ATTORNEYS.

UNITED STATES PATENT OFFICE.

HENRY BRIGGS, OF HASBROUCK, NEW JERSEY.

CHAIN-GEARING.

SPECIFICATION forming part of Letters Patent No. 528,847, dated November 6, 1894.

Application filed January 18, 1894. Serial No. 497,292. (No model.)

*To all whom it may concern:*

Be it known that I, HENRY BRIGGS, a citizen of the United States, residing at Hasbrouck Heights, in the county of Bergen and State of New Jersey, have invented new and useful Improvements in Chain-Gearing, of which the following is a specification.

This invention relates to a chain gearing which comprises a sprocket wheel and a drive chain running over the same and is intended particularly for velocipedes.

The peculiar and novel construction of my chain gearing is pointed out in the following specification and claims and illustrated in the accompanying drawings, in which—

Figure 1:
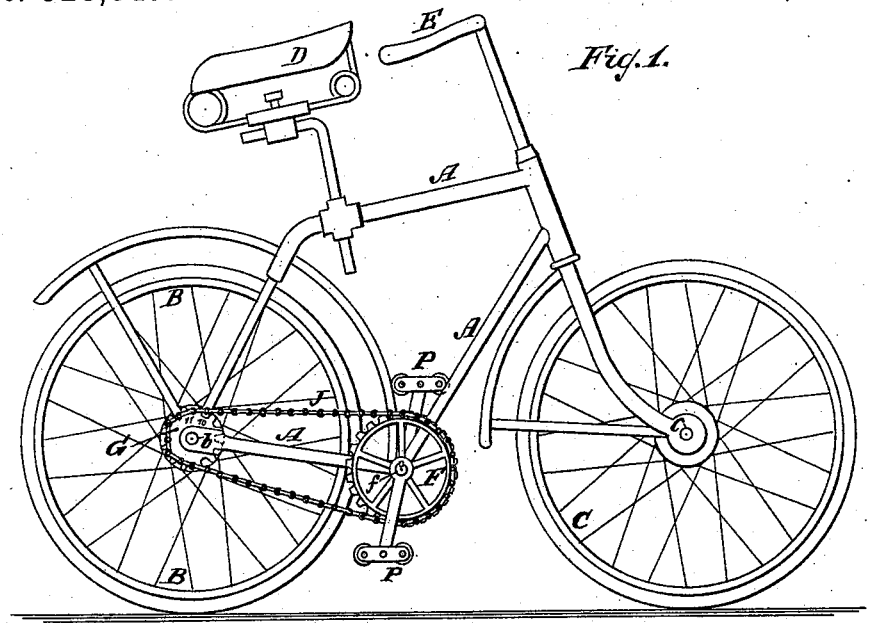
Figure 2:
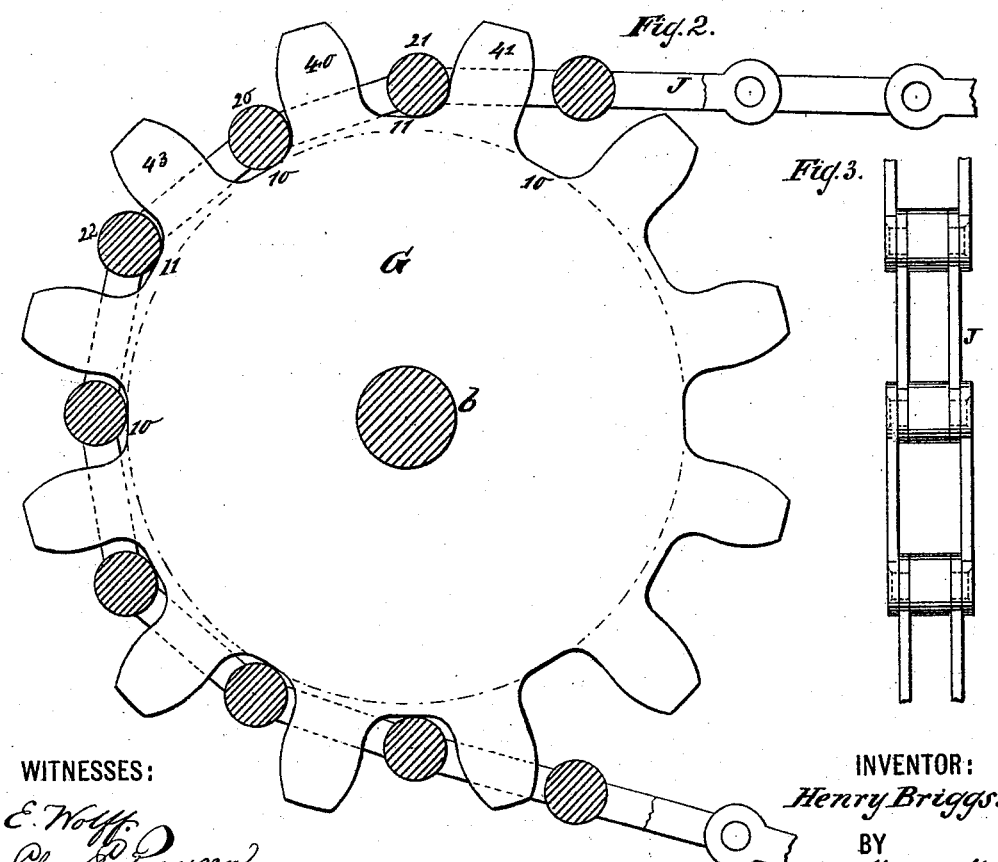
Figure 3:
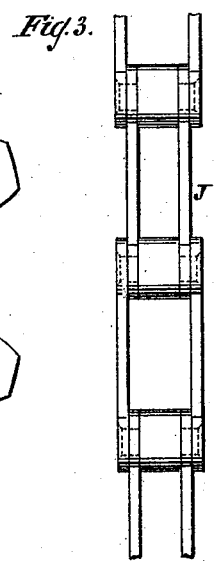
Figure 4:
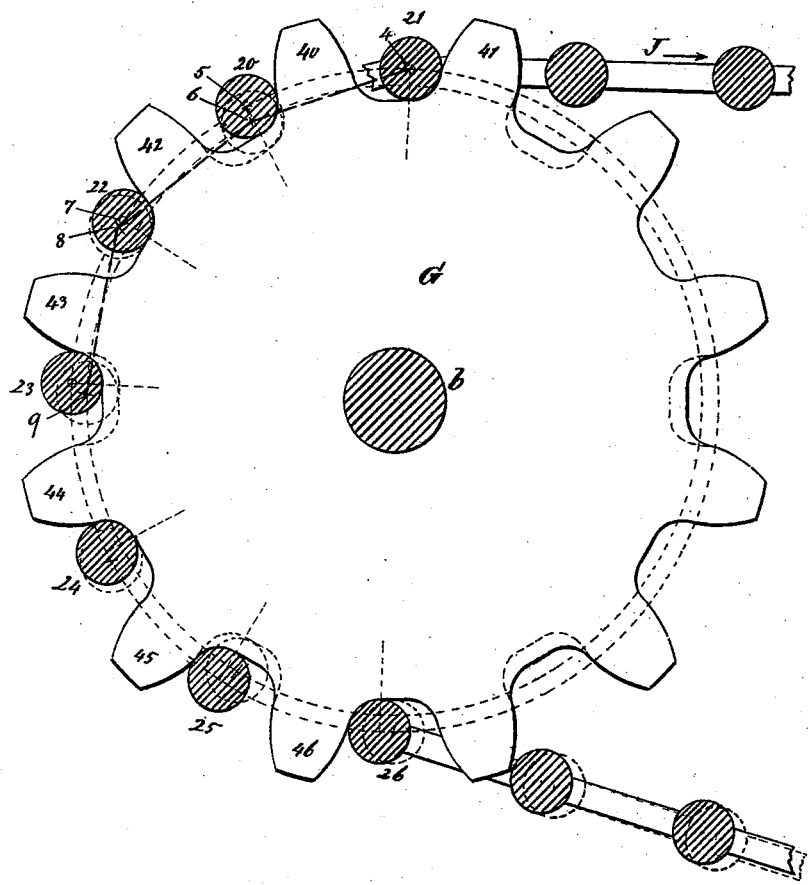

Figure 1 represents a side elevation of a velocipede provided with my chain gearing. Fig. 2 is an enlarged side elevation of the new sprocket wheel and a section of the chain engaging the same. Fig. 3 is a plan or top view of a portion of the chain. Fig. 4 is a face view of a sprocket wheel of the ordinary construction illustrating in dotted lines the difference of the action of the chain on a sprocket wheel constructed according to my invention.

In the drawings the letter A designates the frame in which are mounted the axles $b$ $c$ of the wheels B C and which supports the saddle or seat D and the handle E for steering. In this frame is also mounted the driving axle $f$ which carries the pedals P P and on the axle $b$ of the wheel B is mounted the sprocket wheel G. This sprocket wheel is constructed with recesses 10 and 11 of different depth between the successive cogs, the spaces 10 being made to extend to a greater distance below the pitch-line than the spaces 11 (Fig. 2).

J is the chain which extends around the sprocket wheels F and G and by referring to Fig. 2 it will be seen, that the bar 21 of the chain is the only one which bears against the cog or tooth 41 at the moment when the same occupies the highest position in the sprocket wheel G, while the bar 20 occupies a position in the recess 10 at a small distance away from the cog 40 and the bar 22 of the chain occupies a position in the next succeeding shallow recess 11 at a slightly greater distance from the cog 43 than that between the bar 20 and the cog 40 and so on. It will also be seen that each of the cogs is undercut to a slightly greater degree on that side which faces a deep recess than it is on the side which faces a shallow recess and if the pedal is forcibly depressed at the moment the sprocket wheel G occupies the position shown in Fig. 2, and if this forcible depression should impart to the bar 21 a tendency to ride up on the side of the cog 41, this tendency is immediately checked by the bar 20 which is drawn up against the undercut portion of the cog 40, and if the cog 40 reaches the position of cog 41, the bar 20 having been drawn into the undercut portion of cog 40 will be prevented from riding up on the face of this cog.

By referring to Fig. 4 it will be seen that the bars of the chain J bear closely against the teeth 41, 40, 42, 43, &c., of an ordinary sprocket wheel G with recesses of uniform depth, but when the same chain is used on a sprocket wheel with alternating deep and shallow recesses 10 and 11, the links of the chain engaging simultaneously therewith, as shown in Fig. 2, and in dotted lines in Fig. 4, the center of the bar 20 occupies the point 6 instead of point 5 and said bar 20 does not bear against cog 40. The center of the bar 22 occupies the point 8 instead of point 7 and said bar is at a greater distance from the cog 42 than the distance of the bar 20 from the cog 40 and so on as clearly shown by the dotted lines which indicate the position of the successive bars 24, 25, 26.

When the chain J is in engagement with my sprocket wheel G (Fig. 2) the bars of the chain which engage the shallow recesses 11 are at a greater distance from the center of the wheel than the bars which engage the deep recesses 10 so that the chainlinks form the sides of a polygon with alternately greater and smaller angles at its corners, as seen in Fig. 4, the angle between the lines 4—6 and 6—8 being greater than the angle between the lines 6—8 and 8—9. By these means I have succeeded in reducing the friction between the chain J and the sprocket wheel G to such an extent that I can ride up-hill on my velocipede with comparatively little additional labor.

What I claim as new, and desire to secure by Letters Patent, is—

1. The combination with a sprocket wheel having deep recesses 10 alternating with shallower recesses 11 between its cogs, of a chain the bars of which simultaneously engage the successive deep and shallow recesses of the sprocket wheel so as to cause the chainlinks to form sides of a polygon with alternately greater and smaller angles substantially as described.

2. The combination with the pedal shaft $f$, the sprocket wheel F mounted thereon, and the wheel B, of a sprocket wheel G having deep recesses 10 alternating with shallower recesses 11 between its cogs, and a chain the bars of which engage the sprocket wheel F and simultaneously with the successive deep and shallow recesses of the sprocket wheel G substantially as described.

In testimony whereof I have hereunto set my hand in the presence of two subscribing witnesses.

HENRY BRIGGS.

Witnesses:
WM. C. HAUFF,
E. F. KASTENHUBER.